(No Model.)
P. T. BRADY.
NUT LOCK.
No. 315,895. Patented Apr. 14, 1885.
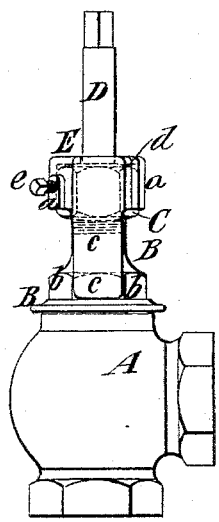
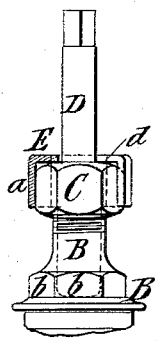
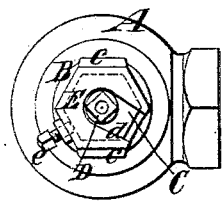
Witnesses:-
Louis M. J. Whitehead.
C. E. Sundgren
Inventor:-
Patrick T. Brady
by his Attys.
Brown and Hall

UNITED STATES PATENT OFFICE.

PATRICK T. BRADY, OF NEW YORK, N. Y.

NUT-LOCK.

SPECIFICATION forming part of Letters Patent No. 315,895, dated April 14, 1885.

Application filed August 6, 1884. (No model.)

*To all whom it may concern:*

Be it known that I, PATRICK T. BRADY, of the city and county of New York, in the State of New York, have invented a new and useful Improvement in Locks for the Glands or Nuts of Stuffing-Boxes, of which the following is a specification.

My invention is applicable generally to stuffing-boxes which are tightened by screwing up the gland or nut, the said gland or nut being provided with a screw-thread fitting a corresponding thread on the bonnet or head through which the stem or rod works; but the invention is more particularly intended for the stuffing-boxes of globe and other valves which are operated to open and close them by turning the stem. In such valves difficulty is often experienced by reason of the gland or nut of the stuffing-box unscrewing when the stem is turned to open the valve, thereby relieving the packing and allowing the steam to blow through around the stem; and the object of my invention is to prevent the gland or nut of a stuffing-box from thus being accidentally turned or accidentally turning and relieving or loosening the packing.

The invention consists in the combination, with a head or bonnet constructed with a stuffing-box and provided with a screw-thread, a rod or stem working in the head or bonnet, and a gland or nut fitting the screw-thread, of a locking cap or collar slotted laterally to enable it to be slipped laterally upon the rod or stem, within which the gland or nut of the stuffing-box is incapable of turning, and which is provided with one or more arms or ears engaging with the head or bonnet and preventing the turning of the cap or collar.

In the accompanying drawings, Figure 1 represents an angle-valve having a slotted locking-cap applied to its gland or nut. Fig. 2 represents the bonnet of the valve and valve-stem and a sectional view of the slotted locking-cap, and Fig. 3 is a plan of the valve and cap.

Similar letters of reference designate corresponding parts in all the figures.

A designates the body or shell of an ordinary angle-valve, and B designates the bonnet or head thereof, having formed in it a stuffing-box, to which is applied a gland or nut, C, of ordinary form. The gland or nut C is externally polygonal, as is usual in valves of this class, and may be screwed up or turned to tighten or compress the packing in the stuffing-box about the stem D. The stem D is to be operated by the usual hand-wheel or handle applied to its upper end, and which is not here shown, as it forms no part of my invention.

E designates a cap formed with a downwardly-projecting flange, a, which is polygonal to fit the gland or nut, and is thereby locked to the gland or nut, so that neither can turn independently of the other.

The head or bonnet B is here shown as having the usual polygonal formation, b, whereby it may be grasped by a wrench to turn it, and the cap E is provided with downwardly-projecting arms or ears c, which embrace the bonnet or head and engage with opposite flattened sides of the portion b of the bonnet or head. The engagement of the arms or ears c with the bonnet holds the locking-cap E against turning, and as the gland or nut C cannot turn in the cap the said gland or nut is held against turning. I have here shown the locking-cap as having two arms, c; but one alone might suffice.

In the cap E is a slot, d, which enables it to be slipped laterally upon the stem D when the hand-wheel or handle is upon the stem, and without removing from the stem the hand-wheel or handle.

In applying the locking-cap E the gland or nut C is first screwed up until the packing is tight and the sides or faces of the gland or nut are approximately parallel with the faces of the polygonal formation b. The cap is then slipped laterally on the stem, which is provided for by the slot d, and is then slipped down on the gland or nut, the arms or ears c coming into engagement with the faces of the portion b on the bonnet or head B. The gland or nut is thus prevented from turning so long as the cap remains upon it and its arms or ears in engagement with the head or bonnet B, and to prevent the said cap from accidentally rising I provide it with a set-screw, e, which may be clamped upon the gland or nut. When the gland or nut is to be screwed up, the set-screw is loosened and the cap entirely removed or raised to free its arms or ears c from the part b of the head or bonnet.

I am aware of Letters Patent No. 87,761, granted to J. R. Cribbs, March 16, 1869, and do not claim anything therein shown or described as of my invention. In that patent is shown a bolt having cut upon it right and left hand threads, the one smaller than the other in diameter, and the two nuts which are screwed thereon have interposed between them a washer, and are held against turning by a rectangular box or keeper which slips over them. To make this lock it is therefore necessary to employ a second nut and provide a second thread and a keeper beyond what would otherwise be necessary. In my lock the screw-thread with which the gland or nut engages is on the head or bonnet, and not on the stem or rod, and hence I employ only the cap or collar in addition to the parts which are necessary in a globe-valve. My cap or collar is also distinguished from the keeper shown in Cribbs's patent in that it is slotted, so that it may be slipped laterally upon the stem, and may therefore be applied to existing valves without necessitating the removal of the hand-wheel from the stem.

What I claim as my invention, and desire to secure by Letters Patent, is—

The combination, with a head or bonnet constructed with a stuffing-box and provided with a screw-thread, a stem working in the head or bonnet, and a gland or nut fitting said thread, of a locking-cap slotted to enable it to be slipped laterally on the stem, fitting the gland or nut, and provided with one or more arms or ears engaging with the head or bonnet, and thereby preventing the turning of the gland or nut, substantially as herein described.

PATRICK T. BRADY.

Witnesses:
 FREDK. HAYNES,
 A. W. DONALD.